United States Patent [19]
Mitsuoka et al.

[11] Patent Number: 5,274,716
[45] Date of Patent: Dec. 28, 1993

[54] OPTICAL PATTERN RECOGNITION APPARATUS

[75] Inventors: Yasuyuki Mitsuoka; Tadao Iwaki; Tomohiro Yoshikawa, all of Tokyo, Japan

[73] Assignee: Seiko Instruments Inc., Tokyo, Japan

[21] Appl. No.: 755,308

[22] Filed: Sep. 5, 1991

[30] Foreign Application Priority Data

Sep. 5, 1990 [JP] Japan .................. 2-236212

[51] Int. Cl.$^5$ ............................................. G06K 9/76
[52] U.S. Cl. .................... 382/31; 359/561; 382/42; 382/43
[58] Field of Search .............. 382/31, 42, 43; 359/561, 559, 560; 364/822

[56] References Cited

U.S. PATENT DOCUMENTS

| | | | |
|---|---|---|---|
| 4,832,447 | 5/1989 | Javidi | 359/561 |
| 4,837,843 | 6/1989 | Owechko | 382/31 |
| 4,949,389 | 8/1990 | Allebach et al. | 382/31 |
| 5,029,220 | 7/1991 | Juday | 382/31 |
| 5,040,140 | 8/1991 | Horner | 359/561 |
| 5,101,270 | 3/1992 | Boone et al. | 382/42 |
| 5,111,515 | 5/1992 | Javidi | 382/31 |
| 5,119,443 | 6/1992 | Javidi et al. | 382/42 |

Primary Examiner—Joseph Mancuso
Attorney, Agent, or Firm—Bruce L. Adams; Van C. Wilks

[57] ABSTRACT

In a joint transform correlator, a technique that performs a correlation processing between two-dimensional images by using a coherent beam, this invention forms a feedback system in which two-dimensional correlation coefficients between at least one reference image and at least one signal image obtained as a result of a correlation processing are input to a linear or non-linear transfer function and in which the intensities of light passing through the reference images corresponding to the correlation coefficients are virtually changed according to the output of the transfer function. And then in this condition a similar correlation processing is performed. This loop of processing is repeated. In this case, when, in addition to an expression of the transfer function, other items—which include a dynamic range of the transfer function and a non-linear transfer function are used, the threshold values are changed according to such conditions as the number and kind of reference images and the distribution of correlation coefficients.

19 Claims, 6 Drawing Sheets

OPTICAL PATTERN RECOGNITION APPARATUS

BACKGROUND OF THE INVENTION

The present invention relates to an apparatus used in the field of optical computing and optical measurement which performs an optical correlation processing using a coherent beam on a two-dimensional image obtained from an imaging device such as a CCD camera to automatically perform pattern recognition and measurement.

Conventionally, the optical pattern recognition apparatus and correlation processing apparatus generally employ a joint transform correlator. As shown, for example, in FIG. 9, a spatial light modulator of the light addressed type is utilized in such apparatus, as disclosed in Japanese Patent Application Laid-Open Nos. 138616/1982, 210316/1982 and 21716/1983. In the FIG. 9 apparatus, a plate 95 has a joint image composed of a reference image, i.e., recognition basis and an input image, i.e., an object of recognition. A laser 91 emits a laser beam which is expanded by a beam expander 92. Thereafter, the expanded laser beam irradiates the joint image on the plate 95 to convert the joint image into a coherent image. The thus obtained coherent image is Fourier transformed by a Fourier transform lens 96. Light intensity distribution of the Fourier transform image is recorded on a spatial light modulator in the form of a liquid crystal light valve 97 which is disposed on a Fourier plane of the lens 96.

Figure 9:
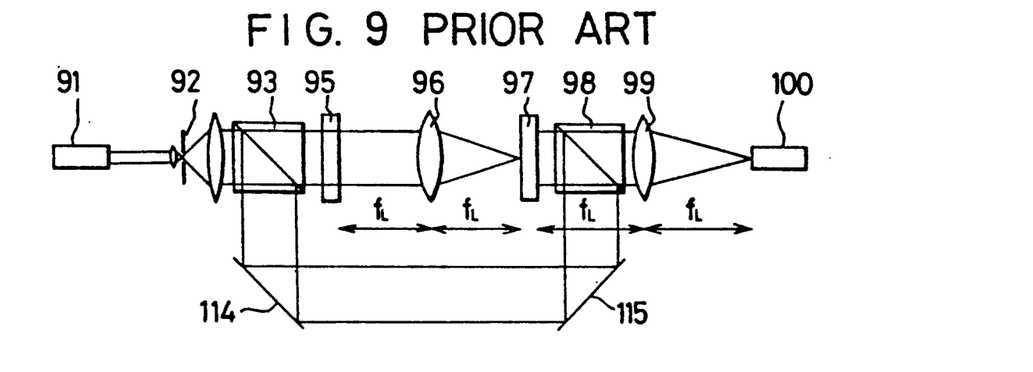
FIG. 9 is a schematic diagram showing the conventional joint transform correlator of the optical writing type.

Next, an incident light beam divided by a beam splitter 93 is directed through mirrors 114,115 and a polarizing beam splitter 98 onto the liquid crystal light valve 97 to read out the recorded light intensity distribution of the Fourier transform image. The thus reproduced Fourier transform image is passed through the polarizing beam splitter 98 and is again Fourier transformed by another Fourier transform lens 99 to produce on its Fourier transform plane a correlation image containing correlation peaks indicative of correlation coefficient between the input image and the reference image. Such peak is detected by a CCD camera 100.

Figure 10:
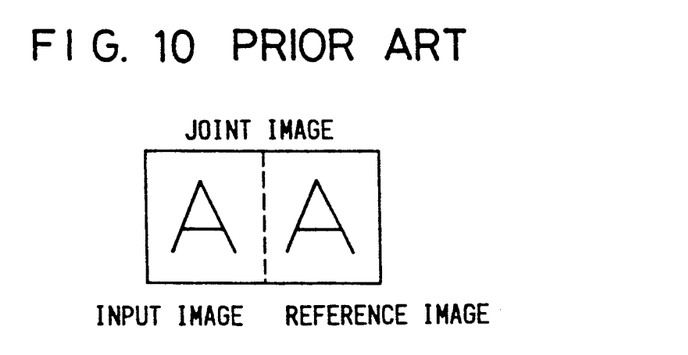
FIG. 10 is an illustration showing an example of a joint image to be processed in the conventional joint transform correlator.
Figure 11:
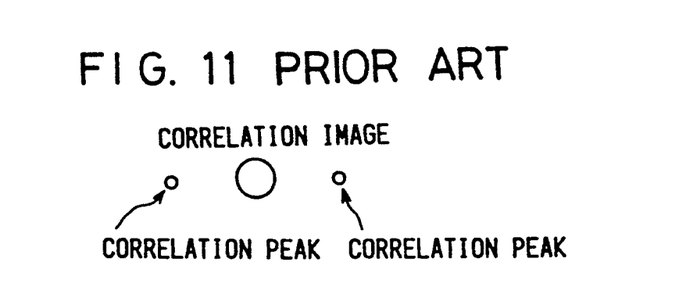
FIG. 11 is an illustration showing an example of correlation peak image from the conventional joint transform correlator.

FIG. 10 shows an example of a joint image composed of an input image and a reference image adjacent to the input image. FIG. 11 shows an example of a pair of correlation peaks detected by the CCD camera 100 and indicative of a correlation coefficient between the reference image and the input image.

However, the conventional apparatus normally treats a pair of a single input image and a single reference image. Therefore, when recognizing a letter of alphabet, a particular character to be recognized is represented as an input image. In order to examine correlation relative to all of the alphabetical characters, a reference image is replaced one by one for each character so as to effect sequential correlation processing, thereby consuming considerable time. In order to solve such problem, concurrent correlation processing could be undertaken between an input image and a multiple of reference images. However, in such case, intensity of each correlation peak is seriously weakened due to interference during concurrent correlation processing between the multiple of the reference images and a single input image, while noise increases to undermine the weakened correlation peaks and to hinder separation thereof to thereby cause incorrect recognition.

Further recently, it has been suggested, for example, in B. Javidi and C. J. Kuo, Applied Optics, 27,663(1988) to binarize the intensity distribution of the joint Fourier transform image between reference and input images to form clear and sharp correlation peaks to improve the S/N ratio. However, this prior art construction is still not effective to carry out the concurrent correlation processing without any incorrect recognition.

SUMMARY OF THE INVENTION

An object of the present invention is to, therefore, provide a joint correlator effective to carry out concurrent correlation processing at fast speed without incorrect recognition.

To solve the above drawbacks, the optical pattern recognition apparatus of this invention comprises: means to transform into a coherent image at least one reference image including a specified object and at least one signal image to be newly input; means to Fourier-transform the coherent image to produce a joint Fourier-transformed image of the reference images and the signal image(s); means to convert the joint Fourier-transformed image into an intensity distribution image and display the intensity distribution image on a spatial light modulator; means to read the intensity distribution image displayed on the spacial light modulator by using a coherent beam; means to perform the Fourier transform again on the intensity distribution image thus read and convert the Fourier-transformed image into a correlation signal by using an imaging device or light detector; means to process the correlation signal to determine a two-dimensional correlation coefficient between the reference images and the signal image(s); means located before or after the reference image to change transmittance or reflectance at a portion corresponding to each reference image in a linear or non-linear relationship with the correlation coefficient; and means to determine or change the linear or non-linear relationship.

In a relationship (feedback transfer function) where the correlation coefficients obtained as correlation peaks are fed back to the intensities of light passing through the reference images corresponding to the correlation coefficients, the above configuration allows not only the expression of the feedback transfer function but also the threshold value and dynamic range to be arbitrarily set according to various conditions such as the number of signal images and reference images, the degrees to which the reference images are alike, and the speed and precision required of pattern recognition. It is also possible to change these setting according to the distribution of the correlation coefficients. Therefore, by setting an appropriate function according to a particular situation, quick and precise pattern recognition and measurement can be performed.

DETAILED DESCRIPTION OF THE PREFERRED EMBODIMENTS

Figure 1:
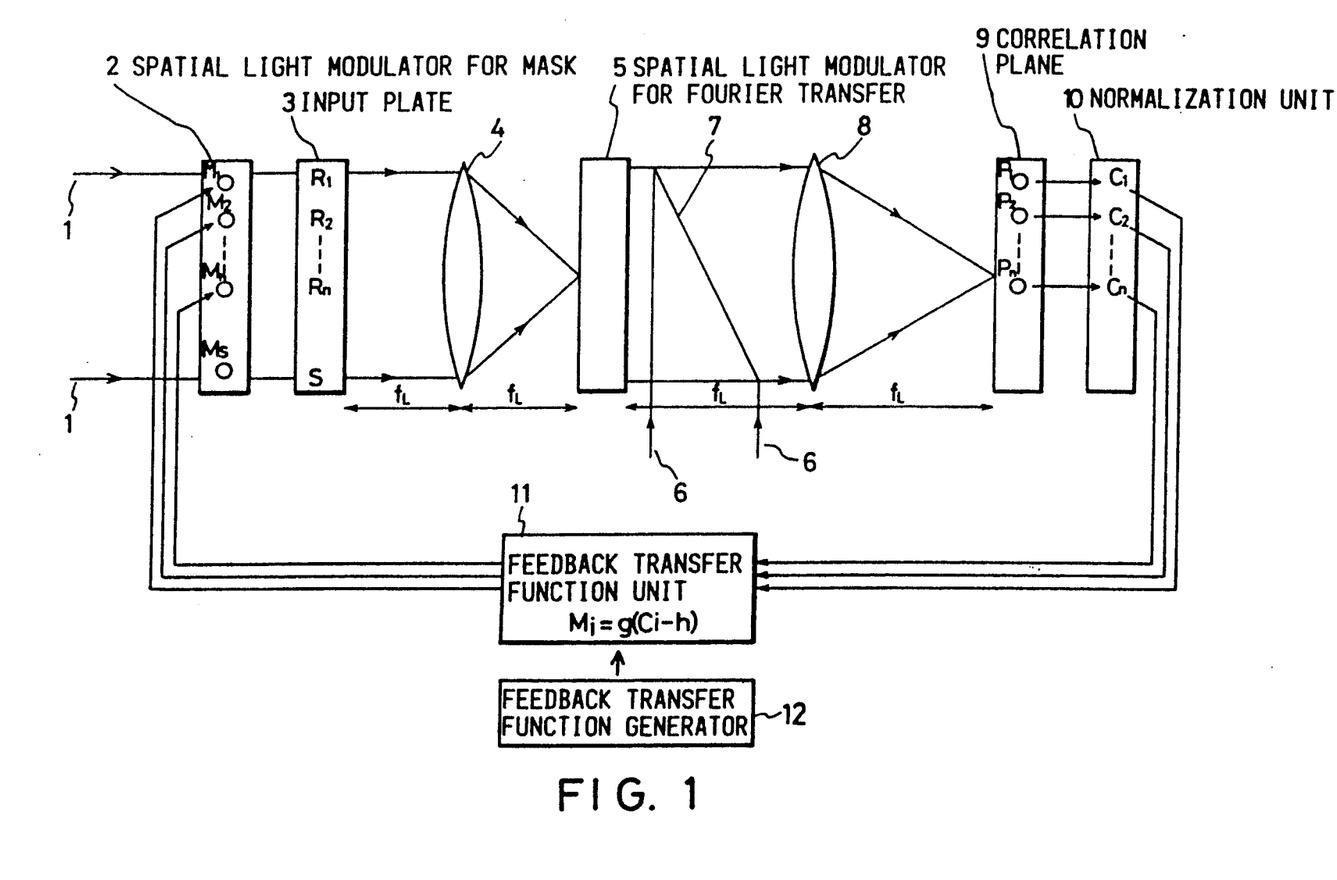
FIG. 1 is a conceptual diagram showing the outline of this invention.

Now, one embodiment of this invention will be described by referring to the accompanying drawings. FIG. 1 shows a conceptual diagram showing the outline of the invention. A spatial light modulator for Fourier transform explained here is of a light writing and reflection type. A means to transform into coherent images at least one reference image including a specified object and at least one signal image to be newly input consists of a write beam 1 and an input image 3. A means to Fourier-transform these coherent images to obtain a joint Fourier-transformed image of the reference images and the signal image comprises a lens 4 for Fourier transform. A spatial light modulator 5 for Fourier transform constitutes a means to transform the joint Fourier-transformed image into an intensity distribution image and display the intensity distribution image on the spatial light modulator. A read beam 6 and a beam splitter 7 form a means to read the intensity distribution image displayed on the spatial light modulator by a coherent beam. A lens 8 for Fourier transform and a correlation plane 9 form a means to perform the Fourier transform again on the intensity distribution image thus read to convert the image into correlation signals by using an imaging device or light detector. A normalization unit 10 processes the correlation signals to determine two-dimensional correlation coefficients between the reference images and the signal image. Located before or after the reference images, a feedback transfer function unit 11 and a spatial light modulator 2 for masking combine to change the transmittances or reflectances at portions corresponding to the reference images linearly or non-linearly with respect to the correlation coefficients. The linear or non-linear relationship is determined or changed by a feedback transfer function generator 12. The fundamental configuration of this invention is the same as that of the optical pattern recognition device, our previous patent application filed on Jun. 15, 1990 Ser. No. 07/539,725, invented by Iwaki et al., assigned to Seiko Instruments Inc. This device adds the following feedback loop to a general joint transform correlator. At a first step, a measurement is taken of light intensities of correlation peaks which represent n two-dimensional correlation coefficients between n reference images and a signal image. At a second step, the light intensities of correlation peaks thus obtained are normalized by the maximum light intensity of all the correlation peaks, and their values are taken as $C_i$ ($i=1, 2, \ldots, n$). At a third step, masking spatial light modulators arranged before or after the reference images are driven in such a way as to make the intensities of light passing through the reference images change virtually linearly or non-linearly with respect to the corresponding normalized correlation peaks $C_i$. That is, transmittances $M_i$ corresponding to the reference images of the masking spatial light modulators are related to the correlation peaks $C_i$ by the following linear or non-linear functions g. These functions g are referred to as feedback functions.

$$M_i = g(C_i) \ (i=1, 2, \ldots, n) \tag{1}$$

In the above method, the correlation coefficients between the reference images and the signal image are fed back to the intensities of light passing through the corresponding reference images. And in this condition the correlation processing is performed again. This feedback process is repeated to recognize a pattern. Depending on the number and kind of the reference images, only the form of the feedback transfer function is modified to change the precision of recognition and the number of feedback operations required for convergence (convergence speed). For example, let us consider a case where the variations of the normalized correlation peaks $C_i$ are large as when the number of reference images is small. In this case, if the feedback function g is linear, a change of correlation coefficient that occurs as a result of one feedback operation is small, making the number of feedback operations required for convergence significantly large. Thus, as a feedback function a Sigmoid function shown below is used.

$$g(x) = [1 + \tan\{(x-a)/x_o\}]/2 \tag{2}$$

In the above equation, increasing the non-linearity by reducing the value $x_o$ enables precise recognition and also reduces the number of feedback cycles necessary for convergence. The Sigmoid function expressed in equation (2), as the value of $x_o$ is reduced, approaches a unit step function increasing the non-linearity. When the non-linearity is large, $a$ can be considered as a threshold value.

Conversely, let us consider a case where the variations of the correlation peaks $C_i$ are small, as when the number of reference images is large. In this case, there may occur an erroneous recognition of the non-linearity being large or a failure of the function to converge, so that the time to convergence becomes longer. However, by reducing the non-linearity of the feedback transfer function g by increasing the value of $x_o$ of the Sigmoid function of equation (2), it is possible to make precise recognition. The linear or non-linear feedback function g remains constant and is not changed during the recognition process that uses feedback operations.

What differs from our previous patent application is the addition of the feedback transfer function generator 12, which enables arbitrary setting or changing of the feedback transfer function 11.

In the pattern recognition apparatus with the above configuration, the input image 3 has n reference images $R_1$ to $R_n$ and one signal image S arranged parallelly thereon. On the spatial light modulator 2 for masking, the transmittances at positions corresponding to the reference images are taken as $M_1$ to $M_n$ and the transmittance at a position corresponding to the signal image is taken as $M_s$. Performing the correlation processing in this invention produces n pairs of correlation peaks on the correlation plane 9. For simplicity, let us consider the correlation peaks $P_1$ to $P_n$ on only one side. By entering the correlation peaks into the normalization unit 10, two-dimensional correlation coefficients $C_1$ to $C_n$ between the reference images and the signal image can be determined. The feedback transfer function 11 is expressed as follows.

$$M_i = g(C_i - h) \; (i = 1, 2, \ldots, n) \tag{3}$$

where h represents a threshold value, g a feedback transfer function 11, and $M_i$ transmittances at portions of the spatial light modulator 2 for masking corresponding to the reference images. The feedback transfer function 11 is set by the feedback transfer function generator 12. The provision of the feedback transfer function generator 12 makes it possible not only to use a preset feedback transfer function 11 but also change the expression and threshold value of the feedback transfer function 11 according to the initial state and the light intensity distribution of the correlation peaks produced during the recognition process that uses feedback operations.

In this way, the light intensities of the correlation peaks are fed back to the intensities of light radiated onto the corresponding reference images, and the correlation processing is performed again. The process is repeated until a precise recognition is obtained.

Among possible forms of the feedback transfer function 11 are a Sigmoid function, a trigonometric function and a logarithmic function as saturated functions. As a step function with at least one step, a unit step function and a multiple step function may be used. It is also possible to use a combination of these functions.

Now, let us consider changes in recognition characteristic that occur when the feedback transfer function 11 is changed.

Figure 4:
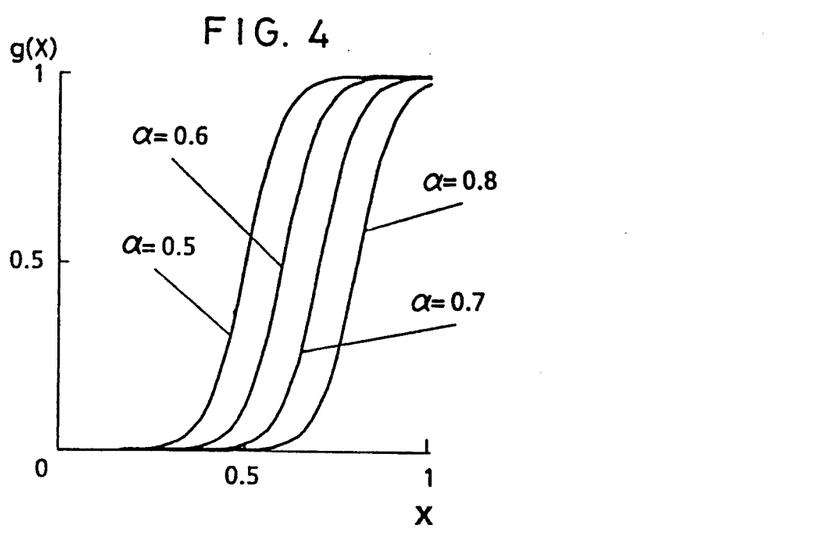
FIG. 4 is a diagram showing an example of a Sigmoid function with a threshold value changed.
Figure 5:
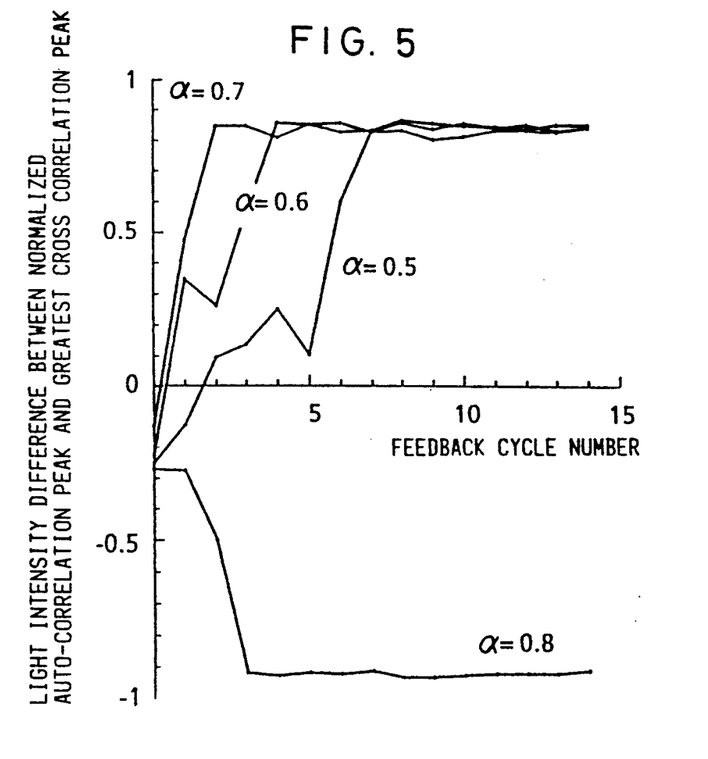
FIG. 5 is a diagram showing a recognition characteristic with a threshold value changed.
Figure 6:
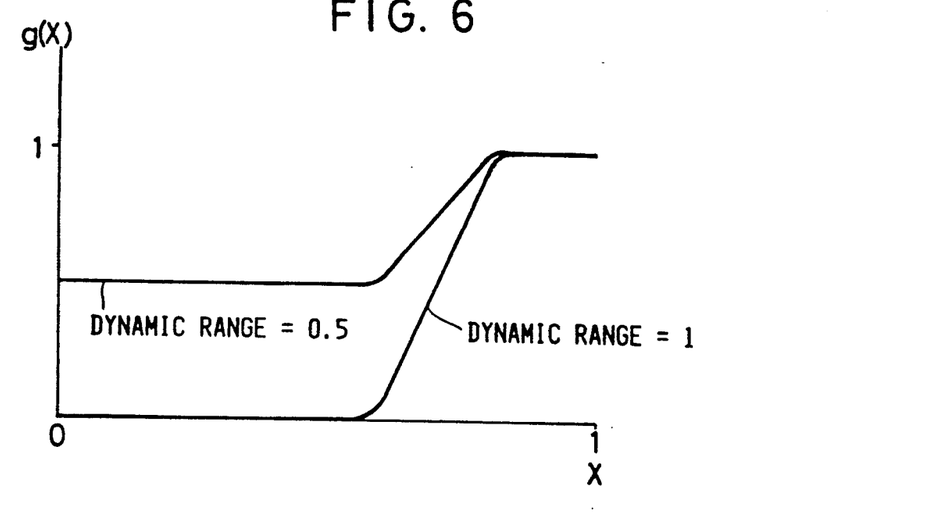
FIG. 6 is a diagram showing an example of Sigmoid function with its dynamic range changed.
Figure 7:
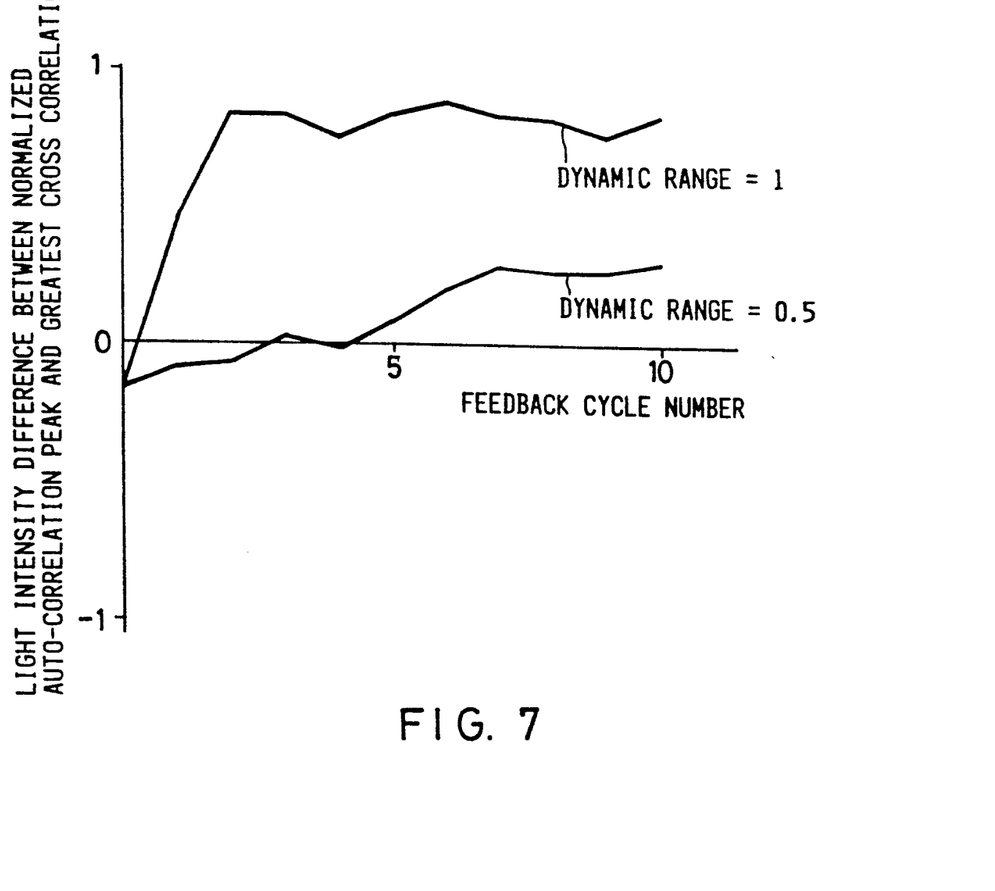
FIG. 7 is a diagram showing a recognition characteristic with a dynamic range changed.

As mentioned in our previous invention, it is possible to change the convergence speed and recognition precision simply by changing the form of the feedback transfer function 11. For example, where a Sigmoid function like the one shown in equation (2) is used as a feedback transfer function 11 with its non-linearity changed, it is seen that the greater the non-linearity, the faster the function converges. When the above Sigmoid function with a large non-linearity is used as the feedback transfer function 11, it is found that as the threshold value is changed, the precision of recognition also greatly varies. An example of the Sigmoid function with $\alpha$ representing the threshold value changed is shown in FIG. 4. In the figure, $x_0 = 0.1$. FIG. 5 shows the recognition characteristic when the Sigmoid function of FIG. 4 is used as the feedback transfer function 11. The abscissa represents the feedback cycle number and the ordinate represents the light intensity difference between the normalized auto correlation peak and the greatest cross correlation peak. If the value is positive, this means that the pattern can be recognized correctly. If it is negative, this indicates that the recognition is false. From this diagram, it is seen that when a feedback transfer function 11 with a large non-linearity is used, the time required for convergence is short if the threshold value is properly set, but that if the threshold value is not appropriate, an erroneous recognition or failure to converge may occur as in the case of $\alpha = 0.8$. Further, where the above Sigmoid function with a large non-linearity is used as a feedback transfer function 11, it is also possible to change the convergence speed by changing the dynamic range of the function. An example with the dynamic range changed is shown in FIG. 6. Changing the dynamic range is equivalent to changing the contrast of the spatial light modulator 2 for masking. FIG. 7 shows the recognition characteristic for this case. The figure indicates that as the dynamic range lowers, the convergence slows down and the light intensity difference between the normalized auto-correlation peak and the greatest cross correlation peak becomes small.

As explained above, it is seen that proper setting of the feedback transfer function 11 can reduce the recognition time and increase the precision.

An appropriate feedback transfer function 11 varies depending on the state of the input image 3 and the requirements for recognition. For example, the states of the input image 3 that affect the correlation peak intensity distribution for the reference images include the number of reference images contained in the input image 3 and the orthogonality among the reference images themselves (the degree to which the reference images are alike). Generally, as the number of the reference images increases, the correlation peak intensities decrease and optical noise components such as speckles increase. This in turn reduces variations in the correlation peak intensities and also reduces the S/N ratio of the correlation peak intensities to noise, making precise recognition difficult. Also when the orthogonality between the reference images is bad, the variations in the correlation peak intensities become small, making correct recognition difficult. For this reason, it is important to appropriately set the feedback transfer function 11 by the feedback transfer function generator 12 according to the state of the input image 3 and the correlation peak intensity distribution.

While, in the above example, the spatial light modulator 5 for Fourier transform is shown to be of a light writing and reflection type, it may be of a transmission type or an electrically writing type, which are in principle identical with the former.

Figure 2:
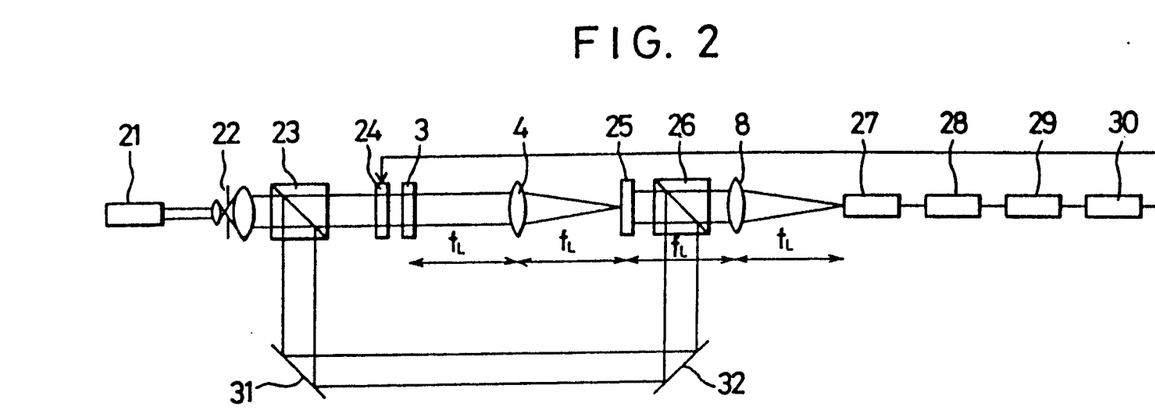
FIG. 2 is a configuration diagram of one embodiment of this invention.

FIG. 2 shows the configuration of an embodiment of this invention. Like a system shown in FIG. 1, the apparatus employs a liquid crystal light valve 25 as the Fourier transform spatial light modulator 5 of light writing and reflection type. A means to convert into a coherent image at least one reference image including a specified object and at least one signal image to be newly input is comprised of a laser 21, a beam expander 22, and an input image 3. The coherent image is Fourier-transformed to produce a joint Fourier-transformed image of the reference image and the signal image by a lens 4 for Fourier transform. The liquid crystal light valve 25 converts the joint Fourier-transformed image into an intensity distribution image and also displays the intensity distribution image on the spatial light modulator. The intensity distribution image displayed on the spatial light modulator is read out through the coherent beam by a beam splitter 23, mirrors 31, 32 and a deflection beam splitter 26. A lens 8 for Fourier transform and a CCD camera 27 perform the Fourier transform again on the intensity distribution image thus read out and then convert the image into correlation signals through an imaging device or a light detector. An A/D convertor 28 and a computer 29 process the correlation signals to determine two-dimensional correlation coefficients between the reference images and the signal image. Located before or after the reference images, the computer 29, a D/A convertor 30 and a masking liquid crystal television 24 together change the transmittances or reflectances at portions corresponding to the reference images in linear or non-linear relationship with the correlation coefficients. The linear or non-linear relationship is determined or changed by the computer 29.

Figure 3:
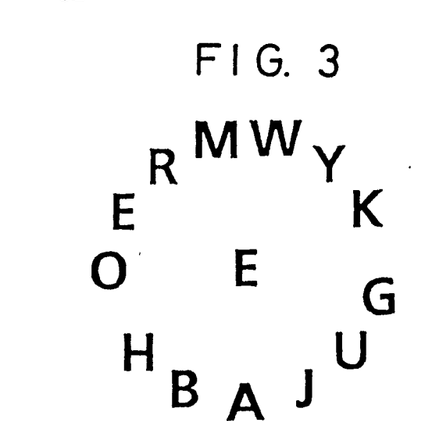
FIG. 3 is a diagram showing one example of an input image used in the embodiment.

A coherent beam emitted by the laser 21 and expanded by the beam expander 22 is divided into two beams by the beam splitter 23. The beam that has passed through the beam splitter 23 now passes through the masking liquid crystal television 24 and strikes the input image 3 on which the signal image and the reference images are parallelly arranged, so as to convert the input image 3 into a coherent image. The coherent image is then Fourier-transformed by the Fourier transform lens 4 and radiated onto the writing surface of the liquid crystal light valve 25. Now, the light intensity distribution image of the Fourier-transformed image is displayed on the liquid crystal display 25. The other beam reflected by the beam splitter 23 is further reflected by the mirrors 31, 32 and the deflecting beam splitter 26 onto the reading surface of the light valve 25, thus converting into a coherent image the intensity distribution image of the Fourier-transformed image displayed on the liquid crystal light valve 25. The coherent image then passes through the polarization beam splitter 26—which is used in place of an analyzer—and is read as a negative or positive image of the intensity distribution, which is then Fourier-transformed by the Fourier transform lens 8. Now the CCD camera 27 can receive the correlation peaks. While the input image 3 and the liquid crystal light valve 25 may be located at any position between the front focal plane and the back focal plane of the Fourier transform lenses 4, 8, it is preferable to install them at the front focal planes or between the Fourier transform lenses 4, 8 and their back focal planes. In this embodiment, the input image 3 is located at the front focal plane of the Fourier transform lens 4 and the liquid crystal light valve 25 is positioned at its back focal plane. At the front focal plane of the Fourier transform lens 8 is located the liquid crystal light valve 25 and at its back focal plane is located the CCD camera 27. The masking liquid crystal television 24 is arranged immediately before or after the input image 3. The correlation signal output from the CCD camera 27, since it is an analog signal, is converted by the A/D convertor 28 into a digital signal, which is then fed to the computer 29, where the light intensities of the correlation peaks are measured. The computer 29 generates an appropriate feedback transfer function 11 and calculates the outputs of the feedback transfer function 11 from the measured light intensities of the correlation peaks. According to the calculated values, the computer 29 produces a signal for activating the masking liquid crystal television 24. The signal produced by the computer 29 is converted by the D/A convertor 30 into an analog signal, which activates the masking liquid crystal television 24. The input image 3, as shown in FIG. 3, has one signal image at a center and a plurality of reference images arranged along a circle centered about the signal image. This configuration is used to make constant the distances from the signal image to the reference images. In this example, the reference images number thirteen. At the initial state, the masking liquid crystal television 24 is made completely transparent so that the reference images and the signal image are radiated with a uniform coherent beam.

Next, the operation of the apparatus will be explained. The process up to where the computer 29 calculates the normalized correlation peak intensities $C_i$ is the same as the one described in the explanation of our previous patent application. At the initial state, the computer 29 calculates the average of the light intensities of correlation peaks $C_i$, which is used as a threshold value h in the equation (3). For simplicity, the form of the feedback transfer function g, i.e., the non-linearity is left as was first set and not changed.

The normalized correlation peak light intensities $C_i$ are entered into the feedback transfer function g thus set, and the outputs $M_i$ are used to change the transmittances at portions corresponding to the reference images on the masking liquid crystal television 24. Under this condition, the correlation processing is carried out again to determine the light intensities of correlation peaks $C_i$. From the next feedback cycle onward, the same feedback transfer function g that was set at the initial state is used as it is. That is, the threshold value is not changed.

Figure 8:
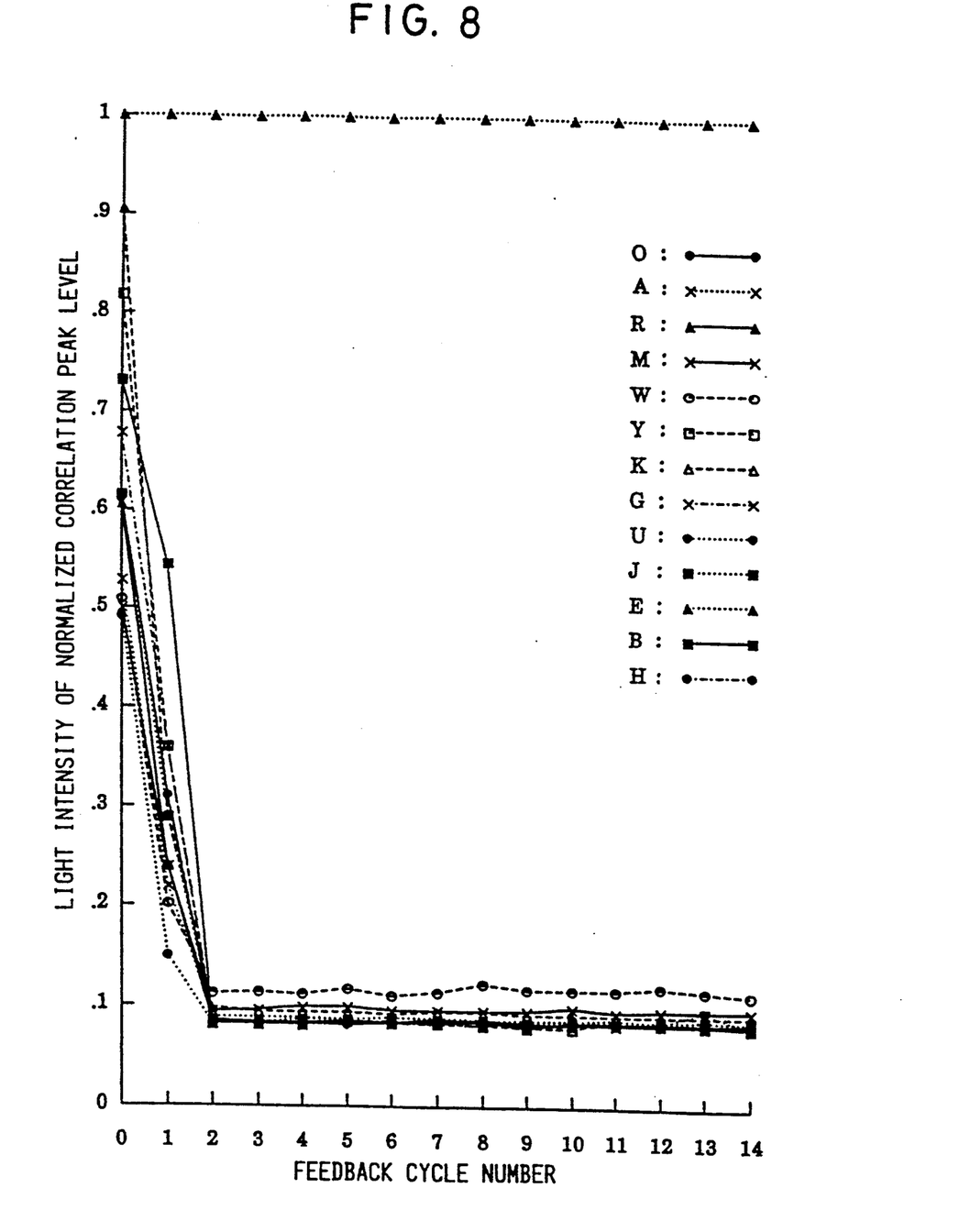
FIG. 8 is a diagram showing changes, due to reiteration, in the light intensity of normalized correlation peak level obtained in the embodiment of this invention.

FIG. 8 shows how the light intensity of normalized correlation peak changes as a result of reiteration when the Sigmoid function of equation (2) is used as the feedback transfer function g. The parameters in equation (2) are: $\alpha = 0.7$ and $x_0 = 0.1$. The value of $\alpha$ corresponding to the threshold value was determined from the correlation peak light intensity distribution at the initial condition in ways described above. It is seen from FIG. 8 that, except for line E, the light intensities of the correlation peaks corresponding to the reference images rapidly decrease as the feedback cycle is repeated, indicating that the correct recognition is made.

With the above-mentioned method of setting the threshold value, a quick and precise recognition was able to be made also when other input images having different reference images were used.

In the above embodiment, when the correlation peak intensity distribution is measured by the computer 29, only the average of the distribution is taken as the threshold value h. But many other methods may be possible, such as using a standard deviation (average - standard deviation) as the threshold value h. There are many alternatives for setting the non-linearity when the Sigmoid function of equation (2) is used as the feedback transfer function g. For example, the parameter $x_0$ representing the non-linearity may be set so as to be inversely proportional to the standard deviation of the light intensities of correlation peaks $C_i$.

Next, let us consider the dynamic range of the feedback transfer function g. The change in the dynamic range corresponds to a change in contrast of the masking liquid crystal television 24. For example, when the contrast of the masking liquid crystal television 24 is large and many reference images are masked by the masking liquid crystal television 24 as a result of feedback, the amount of light striking the writing surface of the liquid crystal light valve 25 becomes too small to display the light intensity distribution of the Fourier-transformed image properly, rendering correct recognition impossible. In such a case, it stands to reason that the light intensity of bias components concentrating around the light axis of the correlation output image received by the CCD camera 27 becomes lower. A possible method for solving this problem may be to measure the light intensity by the computer 29 and set the dynamic range so as to be proportional to the measured value. With this method, a reduced dynamic range is equivalent to a reduced contrast of the masking liquid crystal television 24. So, even when many reference images are masked, the amount of light that passes through the masking liquid crystal television 24 does not decrease dramatically, ensuring an appropriate light intensity distribution of the Fourier-transformed image to be displayed. This in turn results in correct pattern recognition. Generally, however, as the contrast of the masking liquid crystal television 24 is increased, the transmittance of light decreases, lowering the utilization efficiency of the laser beam. For this reason the contrast cannot be made too high. Therefore, since such a phenomenon as mentioned above rarely occurs, the dynamic range of the feedback transfer function g in many cases can normally be set at maximum and no change is necessary. Further, in the above embodiment the light intensity distribution of correlation peaks is measured only at the initial state and the feedback transfer function g is not changed in the succeeding feedback cycles. It is, however, possible to measure the light intensity distribution of correlation peaks in each feedback cycle and, based on that information, change the threshold value h and non-linearity of the feedback transfer function g by the computer 29.

In the above embodiment, the method of determining the feedback transfer function g involves measuring the light intensity distribution of normalized correlation peaks at initial condition by the computer 29 to set an appropriate form of function and a threshold value h. However, if the function form or threshold value h are not changed during the recognition process, the simplest method may be to preselect an appropriate feedback transfer function g through trial and error based on experience. For example, an operator may choose an appropriate threshold value h or change the function form according to the number of reference images, as whether the reference image is a character or a complex image, or to the extent to which the reference images are alike. Alternatively, information such as operator experience may be accumulated in the computer as database to build an expert system.

Although the above embodiment employs the Sigmoid function as a feedback transfer function, a unit step function or a multiple step function may also be used without deviating from the operation principle of this invention.

The liquid crystal light valve 25 in the above embodiment may use a nematic liquid crystal or ferroelectric liquid crystal as a light modulating material.

While, in the above embodiment, the Fourier transform spatial light modulator of a light writing and reflection type such as the liquid crystal light valve 25 is used, it is also possible to employ a transmission type Fourier transform spatial light modulator, such as a spatial light modulator that uses a BSO crystal ($Si_{12}SiO_{20}$) as the modulating material. Instead of using the light writing type spatial light modulator, the Fourier-transformed image, picked up by the CCD camera, may be displayed on an electrical writing type spatial light modulator.

The above embodiment performs simultaneously writing and reading the light intensity distribution of the Fourier-transformed image to and from the liquid crystal light valve 25. Let us consider a case of the Fourier transform spatial light modulator having a memory characteristic, for example a liquid crystal light valve using a ferroelectric liquid crystal. In this case, a shutter is provided at an arbitrary position in each of two light paths running from the beam splitter 23 to the writing and reading planes of the liquid crystal light valve 25. This eliminates the effect the read beam has on the writing of the light intensity distribution of the Fourier-transformed image and also the effect of the write beam on that image being read out. These shutters need only be controlled by the computer 29 so that during writing, only the shutter on the writing light path is opened and during reading only the shutter on the reading light path is opened.

In the embodiment the total amount of light that passes through the reference images is not normalized to make it constant. But if there are large differences between the amounts of light that pass through each reference image, as when the size of each reference image differs, the light amounts passing through the reference images should be normalized to improve the recognition performance, as described in our previous invention cited in this section.

While, in the embodiment, the light beam from the laser 1 is separated into two beams by the beam splitter 23, it is of course possible to use two lasers.

Although the input image 3 of the above embodiment is located immediately behind the masking liquid crystal television 24, it may be placed before the masking liquid crystal television 24 if they are arranged close together.

While the input image 3 in the above embodiment consists of one signal image and a plurality of reference images as shown in FIG. 3, it may consist of a plurality of signal images and one reference image or of a plurality of both the signal and reference images.

The laser 21 may be of any type, such as gas laser or semiconductor laser as long as they generate a good coherent beam.

While the embodiment uses the masking liquid crystal television 24 to change the intensity of light applied to the reference images, it need only be a spatial light modulator that can change the transmittance or reflectance in accordance with the output $M_i$ of the feedback transfer function g.

In the embodiment there is no need to use a lens with equal focal distances for the Fourier transform lens 4, 8.

What is claimed is:

1. An optical pattern recognition apparatus for applying optical correlation processing using coherent light to a two-dimensional image so as to automatically recognize and measure a particular pattern, comprising:
   means for converting at least one reference image and at least one input image into coherent images;
   means for Fourier transforming the coherent images to produce a joint Fourier transform image of the reference image and the input image;
   means including a spatial light modulator for converting the joint Fourier transform image into an intensity distribution image and recording the same on the spatial light modulator;
   means for reading the image recorded on the spatial light modulator by using coherent light;
   means for Fourier transforming the read image into a correlation image;
   means for converting the correlation image into at least one correlation signal;
   means for processing the correlation signal to determine at least one correlation coefficient between the reference image and the input image corresponding to the at least one reference image respectively;
   means for determining and correcting a transfer function;
   means for obtaining at least one functional value based on the transfer function by applying the correlation coefficient thereto corresponding to the at least one reference image respectively; and means including another spatial light modulator adjacent to a plane of the reference image for changing the intensity of the coherent light passing through the at least one reference image according to the at least one functional value respectively.

2. An optical pattern recognition apparatus according to claim 1; wherein the transfer function can be represented by at least one of a saturation function, a sigmoid function, a trigonometric function, a logarithmic function, a step function having at least one stage, and combinations thereof.

3. An optical pattern recognition apparatus according to claim 1; wherein the means for determining and correcting the transfer function determines and corrects the transfer function according to the number of reference images.

4. An optical pattern recognition apparatus according to claim 1; wherein the means for determining and correcting the transfer function determines and corrects the transfer function according to an orthogonality among the reference images themselves.

5. An optical pattern recognition apparatus according to claim 1; wherein the means for determining and correcting the transfer function determines and corrects the transfer function according to a distribution of the correlation coefficient.

6. An optical pattern recognition apparatus according to claim 1; wherein the means for determining and correcting the transfer function determines and corrects a threshold value of the transfer function according to a mean value among data depending on the correlation coefficient.

7. An optical pattern recognition apparatus according to claim 1; wherein the means for determining and correcting the transfer function determines and corrects a threshold value of the transfer function according to a difference between a means value among data depending on the correlation coefficient and a standard deviation thereof.

8. An optical pattern recognition apparatus according to claim 1; wherein the transfer function is represented by a Sigmoid function, and the means for determining and correcting the transfer function determines and corrects a parameter representing feature of non-linearity of the transfer function according to data which is inversely proportional to a standard deviation among data depending on the correlation coefficient.

9. An apparatus for optical pattern recognition by iterative processing, comprising: first converting means for converting at least three images comprised of at least one reference image and at least one input image into a joint coherent image; first transforming means for Fourier transforming the joint image into a joint Fourier transform image; recording means for perceiving and recording the Fourier transform image as an intensity distribution image; reading means for reading the intensity distribution image from the recording means using coherent light; second transforming means for Fourier transforming the read image into a correlation image; second converting means for converting the correlation image into at least one correlation signal; processing means receptive of the correlation signal for determining at least one correlation coefficient for each said reference image correlated with each said input image; determining means for determining and correcting a transfer function; obtaining means for obtaining at least one functional value based on the transfer function by applying the correlation coefficient thereto corresponding to each said respective reference image; feedback means operable with each iteration for changing the light intensity of each said reference image dependent on the at least one functional value so as to correspondingly alter the perception of at least one said reference image by said recording means to thereby effect optical pattern recognition by repetitively reducing with each iteration the perception of said at least one reference image not having a highest correlation coefficient.

10. An apparatus for optical pattern recognition according to claim 9; wherein the determining means includes means for determining the transfer function as at least one of a saturation function, a Sigmoid function, a trigonometric function, a logarithmic function, a step function having at least one stage, and combinations thereof.

11. An apparatus for optical pattern recognition according to claim 9; wherein the determining means includes means for determining and correcting the transfer function dependent on the number of reference images.

12. An apparatus for optical pattern recognition according to claim 9; wherein the determining means determines and corrects the transfer function dependent on an orthogonality among the reference images.

13. An apparatus for optical pattern recognition according to claim 9; wherein the determining means includes means for determining and correcting the transfer function dependent on a distribution of the at least one correlation coefficient.

14. An apparatus for optical pattern recognition according to claim 9; wherein the determining means includes means for determining and correcting a threshold value of the transfer function according to a mean value dependent on the at least one correlation coefficient.

15. An apparatus for optical pattern recognition according to claim 9; wherein the determining and correcting means includes means for determining and correcting a threshold value of the transfer function according to a mean value dependent on the at least one correlation coefficient and a standard deviation thereof.

16. An apparatus for optical pattern recognition according to claim 9; wherein the determining means includes means for determining and correcting the transfer function as a Sigmoid function corrected according to an inverse proportion of a standard deviation dependent on the at least one correlation coefficient.

17. An apparatus for optical pattern recognition according to claim 9; wherein the determining means includes means for determining and correcting the transfer function dependent on the at least one correlation coefficient and the joint coherent image.

18. An apparatus for optical pattern recognition according to claim 9; wherein at least one of the first converting means and the second converting means includes a spatial light modulator.

19. An apparatus for optical pattern recognition according to claim 18; wherein the spatial light modulator comprises one of a liquid crystal type, BSO crystal type and electrical writing type.

* * * * *